United States Patent [19]

Nelson

[11] 3,897,811
[45] Aug. 5, 1975

[54] NOTCHING MACHINE
[75] Inventor: Nolan B. Nelson, Greensboro, N.C.
[73] Assignee: Nelson Machine Grinder Company, Inc., Greensboro, N.C.
[22] Filed: May 2, 1974
[21] Appl. No.: 466,145

[52] U.S. Cl....... 144/242 R; 144/136 R; 144/245 R; 198/20 C; 214/6 BA
[51] Int. Cl.².. B27C 1/12; B27C 5/02; B65G 47/04
[58] Field of Search.... 144/2 R, 3 R, 242 R, 245 R, 144/136 R, 136 D; 198/20 C, 25, 212; 214/6 BA

[56] References Cited
UNITED STATES PATENTS
1,956,911  5/1934  Tate................................ 144/136 D
2,142,271  1/1939  Herrmann....................... 198/20 C Primary Examiner—J. M. Meister
Assistant Examiner—W. D. Bray

[57] ABSTRACT

A machine for notching sequentially selected portions of a plurality of advancing pieces of elongated stock material includes a support for receiving a plurality of longitudinally aligned pieces of stock material and a feed means including a rotating cam member for intermittently displacing the stock material on the support into engagement with cutter means. The cam member includes an arcuate portion for advancing and aligning each piece of stock material and a straight portion for permitting an additional piece of stock material to be placed forwardly of the cam member for subsequent displacement into engagement with the stock material already on the support.

9 Claims, 7 Drawing Figures 3,897,811

PATENTED AUG 5 1975

SHEET 1

3,897,811

PATENTED AUG 5 1975    SHEET    2

NOTCHING MACHINE

BRIEF SUMMARY AND OBJECTS OF THE INVENTION

The present invention is directed to a notching machine, and more particularly to a machine for selectively notching sequentially, a plurality of pieces of stock material by intermittently advancing the stock material with a novel feed mechanism.

The machine preferably permits each piece of stock material to be displaced vertically, by gravity, from a first support means at one level onto a second support means at a lower level. A driven cam member rotates in a horizontal plane and intermittently advances and aligns stock material on the second support means with an arcuate portion. The cam member also includes a straight portion which permits the piece of stock material to drop from the first support at one elevation to the second support at a lower elevation when the straight portion of the cam is generally parallel with the pieces of stock material and in abutting relation positioned on the second support and being advanced to the cutter means.

One of the primary objects of the invention is the provision of a new and improved notching machine.

Another object of the invention is the provision of a novel feeding mechanism for advancing stock material to cutter assemblies.

Other objects and advantages of the invention will become apparent when considered in view of the following detailed description.

DETAILED DESCRIPTION OF THE INVENTION

Figure 1:
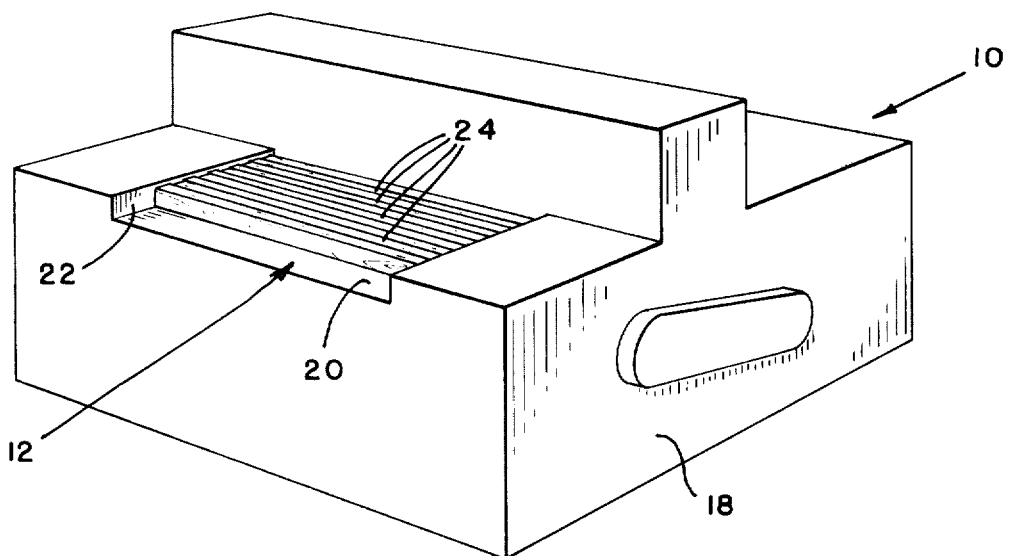
FIG. 1 is a schematic, perspective view of the notching machine of the present invention.

Referring to the drawing, the notching machine 10 includes a section 12 for receiving stock material, a feeding station 14 and a cutting station 16, all supported upon a base frame 18.

The stock-receiving section 12 includes a horizontally disposed, open support plate 20 and with upstanding end plates 22 which serve to support and guide stock material to the feeding station 14. The support plate 20 preferably is of a size to support a plurality of pieces of material 24 thereon, and the spacing between upstanding end plates is sufficient to receive therebetween stock material 24 of a desired length.

Figures 6, 7:
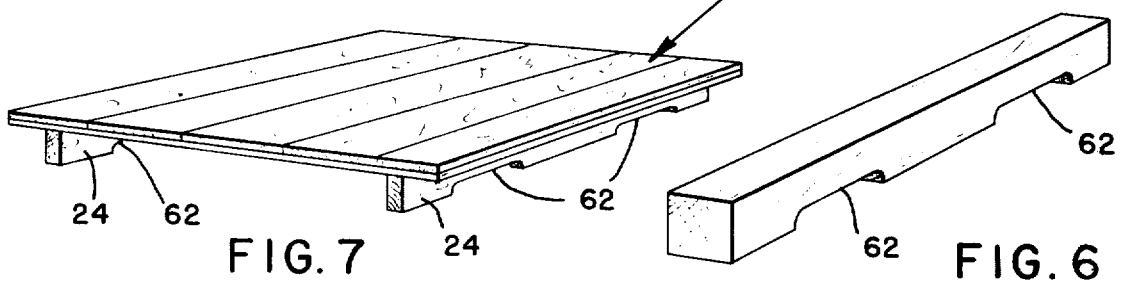
FIG. 6 is an enlarged, perspective view of a piece of material after advancement through the notching machine.
FIG. 7 is a perspective view of a pallet utilizing spaced, notched members for facilitating lifting of the pallet.

In the drawing, with the exception of FIG. 6, the material 24 may be wooden 2×4's or 4×4's. These are generally used for the supports of a pallet or skid and the notched portions will cooperatively receive the fork lift members of a fork lift truck to raise or lower the pallet on which various materials are positioned. The material 24 may be manually placed upon and advanced along support plate 20 until the forwardmost piece of material slides off the plate 20 and drops vertically onto a support plate 26. A guide 28 confines the movement of each piece of material as it drops from plate 20 onto plate 26 at the feeding station 14.

At the feeding station 14, longitudinally-abutting lengths of material are advanced along a support plate 26 by a pair of aligned members or cams 30 mounted for rotation in a horizontal plane about vertical, spaced apart axes. The outer periphery of each member 30 includes an arcuate portion 32 for engaging a piece of material 24 and a straight portion 34 for permitting a piece of stock material 24 to be positioned upon the plate 26. Each member 30 is eccentrically mounted upon and fixed for rotation with a vertically disposed shaft 36. The shafts 36, 36 are coupled to an elongated shaft 38 by bevel gearing 40, 42. The shaft 38, in turn, is driven from motor 44 by means of the pulleys 46, 48 and flexible coupling 50.

Figure 2:
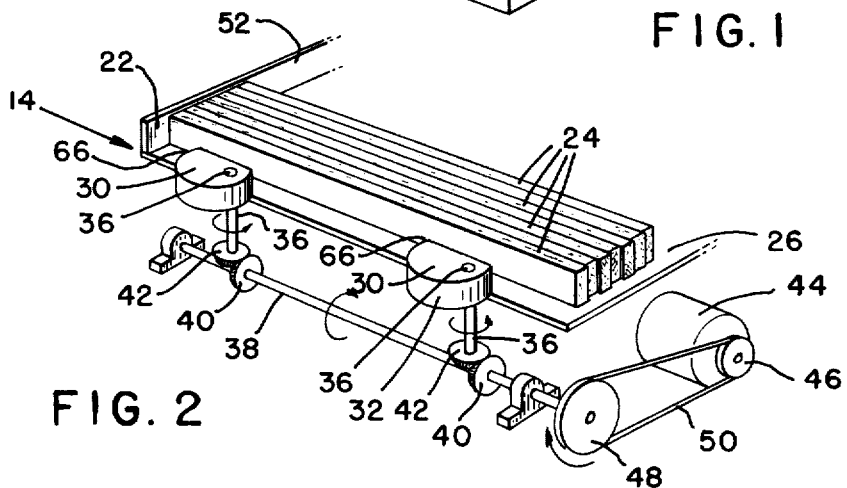
FIG. 2 is a schematic, perspective view of the novel feed mechanism of the notching machine for advancing the stock material to cutters.
Figure 3:
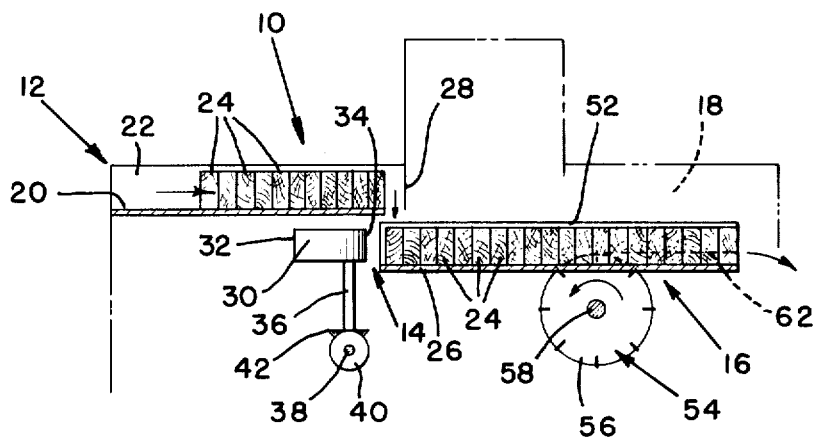
FIG. 3 is a schematic, fragmentary, side elevational view of the notching machine illustrating the movement of the advancing stock material, the feed mechanism in the cutters.
Figure 5:
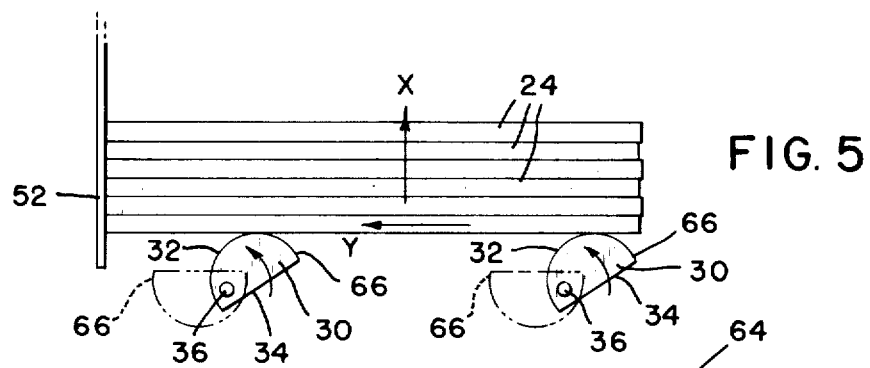
FIG. 5 is a schematic top plan view of the feed cams for moving the stock material into engagement with a stop member and for feeding the stock material.

Upon rotation of the members 30, 30 in a counter-clockwise direction, FIGS. 2 and 5, the eccentric mountings and the arcuate surfaces 32 serve as feed cams to feed the stock material 24 in the direction of the arrows X and Y, as will be subsequently described. A stop or guide member 52 limits displacement of the stock material 24 in the direction of arrow Y.

The stock material is advanced forwardly by the cam members 30 to the cutting station 16. One or more cutter assemblies 54, which may comprise a series of rotary cutters or saw blades, are selectively positioned to provide the desired width of cuts upon the stock material 24.

Each cutter assembly 54 may comprise a plurality of rotating cutter members 56 driven from a horizontally disposed shaft 58 which receives its drive from a motor 60 through conventional coupling means. The cutters 56 of each cutter assembly 54 extend through openings in support plate 26 and upon rotation thereof and advancement of the material 24, serve to notch out selected areas of the lower sections of the stock material 24. The width and depth of the notches 62 may be varied depending upon the size and adjustment of the cutter assemblies 54. If desired, the cutter assemblies could be mounted above the stock material 24 to notch the top portions thereof.

The notched stock material 24 may be used in the construction of pallets or other structures 64 where such notches facilitate lifting, binding, etc., of the structures.

Figure 4:
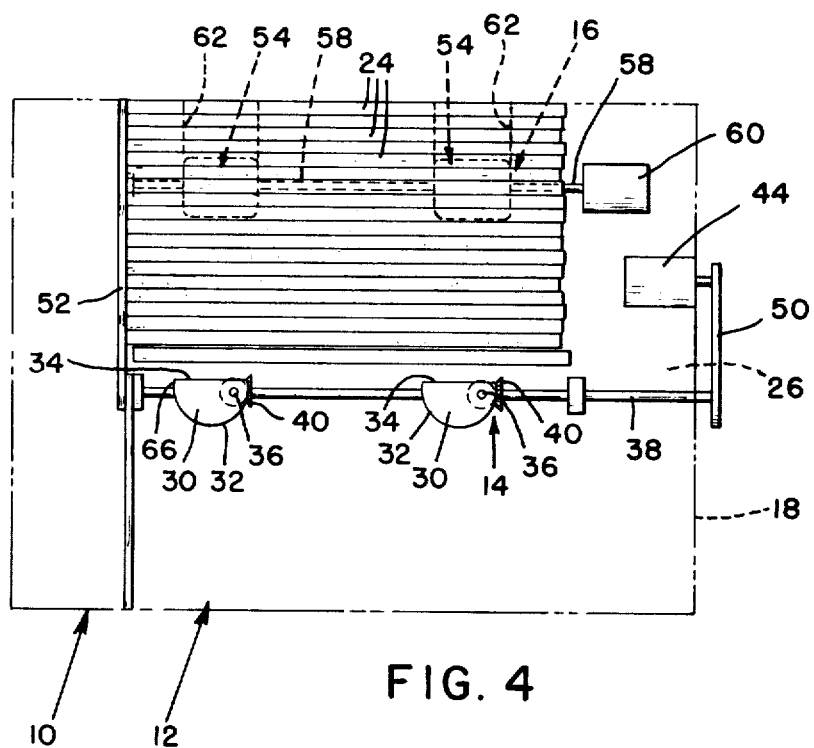
FIG. 4 is a schematic fragmentary plan view of the notching machine.

In the operation of the structure, individual pieces of stock material are placed in longitudinally abutting relation upon the support plate 20, as shown by FIG. 1. As additional pieces of material are placed upon plate 20, they may be advanced either manually or by a power feed mechanism. As the forwardmost piece of material on plate 20 is advanced, it drops vertically, by gravity, from the support plate 20, assisted by guide 28, onto support plate 26 at the rear of a plurality of pieces of stock material already positioned upon plate 26. The straight edge portions 34 of the cams 30 permit the stock to drop unobstructed onto the support plate 26. The cams 30 are aligned to engage the back portion of the rearwardmost piece of stock material 24 on support plate 26. Rotation of the cams 30 in a counterclockwise direction brings the arcuate portions 32 into engagement with the rearwardmost piece of stock material and feeds forwardly all stock material on the plate 26 until one or more pieces of stock material are engaged and notched by the cutter assemblies 54. Due to the eccentric mounting, the curved portions 32 of the rotating cams 30 gradually feed the stock material forwardly until the outermost segments 66 of the cam arcuate portions disengage the rearwardmost piece of stock material 24 and the straight portions 34 are positioned as shown by FIGS. 2 and 4 and in broken lines on FIG. 5, to permit a piece of stock material to fall from support plate 20 onto support plate 26. Counterclockwise rotation of the arcuate portions 32 also serves to urge the rearwardmost piece of stock material 24 longitudinally into abutting relation with the stock member 52 to align the edges of the stock material.

I claim:

1. In a machine for notching stock material advanced to at least one rotary cutter assembly; a frame, means mounted upon said frame for supporting in flat longitudinally abutting relation a plurality of elongated pieces of stock material, stop means for limiting longitudinal displacement of elongated pieces of stock material, and feed means for simultaneously advancing a plurality of longitudinally abutting pieces of stock material to the cutter assembly and for displacing longitudinally the stock material into engagement with said stop means for aligning the pieces of stock material.

2. A machine as recited in claim 1, wherein said feed means includes at least one rotary member for simultaneously advancing the stock material toward the cutter assembly and displacing the stock material into engagement with said stop means.

3. A machine as recited in claim 1, wherein said feed means includes at least one rotating cam member having an arcuate portion for engaging and displacing a piece of stock material and a straight portion for permitting a piece of stock material to be positioned adjacent said cam member for subsequent displacement by the arcuate portion of said rotating cam member.

4. A machine as recited in claim 3, and further including plate means in vertical spaced relation above said cam member for receiving and supporting at least one piece of stock material, adjacent end portions of said plate means and said support means being in overlapping relation to permit a piece of stock material to fall by gravity upon said support means and forwardly of said rotatable cam member.

5. A machine as recited in claim 4, wherein the arcuate portion of said cam member advances the stock material upon said support means towards the cutter assembly sufficiently to receive an additional piece of stock material from said plate means when the straight portion of said cam member is substantially parallel with the longitudinally extending pieces of stock material on said support means.

6. A machine for notching stock material comprising a base frame, support means on said base frame for receiving and supporting thereon a plurality of flat longitudinally aligned pieces of stock material, rotary feed means for intermittently and simultaneously advancing and aligning the pieces of stock material, and cutter means for removing selected portions of the advancing pieces of stock material.

7. A machine as recited in claim 6, wherein said rotary feed means includes at least one cam member mounted for rotation about a vertical axis and including a first arcuate portion for advancing the stock material a selected distance at least equal to the thickness of a piece of stock material, and a straight portion for permitting another piece of stock material to be located intermediate the straight portion and the previously advanced stock material.

8. A machine as recited in claim 6, wherein said cutter means extends through at least one opening in said support means for engaging the stock material.

9. A machine as recited in claim 6, wherein said rotary feed means includes a plurality of aligned cam members mounted for rotation about spaced, parallel axes, said cam members being rotatable in a horizontal plane aligned with the stock material on said support means.

* * * * *